United States Patent [19]
Fairchild

[11] Patent Number: 6,061,949
[45] Date of Patent: May 16, 2000

[54] THRUST GENERATING FLEXIBLE FIN FISHING LURE

[76] Inventor: Nicholas Clay Fairchild, 804 Rolling Meadows Dr., Quincy, Mich. 49082

[21] Appl. No.: 09/015,183

[22] Filed: Jan. 29, 1998

[51] Int. Cl.$^7$ .................................................. A01K 85/00
[52] U.S. Cl. ............................................................ 43/42.28
[58] Field of Search ............................... 43/42.26, 42.27, 43/42.28, 42.02, 42.24

[56] References Cited

U.S. PATENT DOCUMENTS

| | | | |
|---|---|---|---|
| 3,958,358 | 5/1976 | Firmin | 43/42.27 |
| 4,573,283 | 3/1986 | Pippert | 43/42.24 |
| 4,594,806 | 6/1986 | Brown | 43/42.27 |
| 4,790,100 | 12/1988 | Green, Sr. | 43/42.26 |
| 5,016,387 | 5/1991 | Beaupre | 43/42.33 |
| 5,088,226 | 2/1992 | Bazinet . | |
| 5,193,299 | 3/1993 | Correll et al. | 43/42.24 |
| 5,197,221 | 3/1993 | Kresl | 43/42.03 |
| 5,732,502 | 3/1998 | Hansen | 43/42.39 |

*Primary Examiner*—Thomas Price
*Attorney, Agent, or Firm*—Taylor & Aust, P.C.

[57] ABSTRACT

An improved thrust generating flexible fin fishing lure for use in various types of sport fishing, such as ice fishing, jigging, bait casting, or the like. The thrust generating flexible fin fishing lure according to the present invention comprises an elongated body with a curved tail, at least a pair of thrust generating flexible fins on either side for the purpose of redirecting rearward a portion of a vertical flow of water moving past said lure and fin(s) and, thereby, causing thrust and forward movement of said lure. Further provided by the curved tail is a means of directional control causing the present invention to swim in a continuous and fully circular pattern.

13 Claims, 3 Drawing Sheets

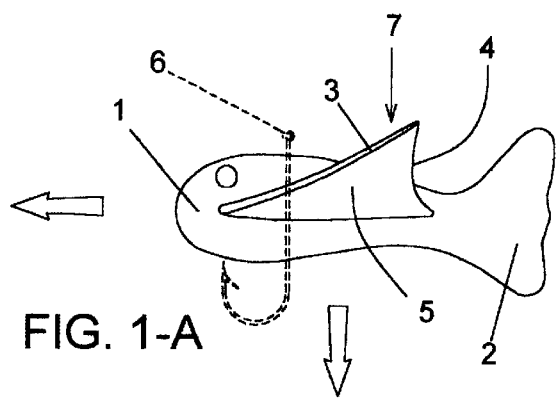
FIG. 1-A  FIG. 1-B
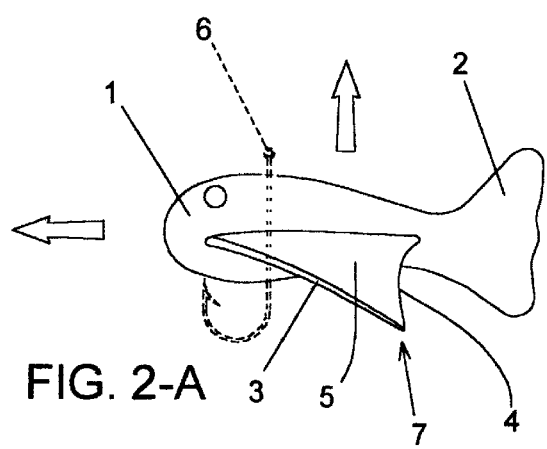
FIG. 2-A  FIG. 2-B
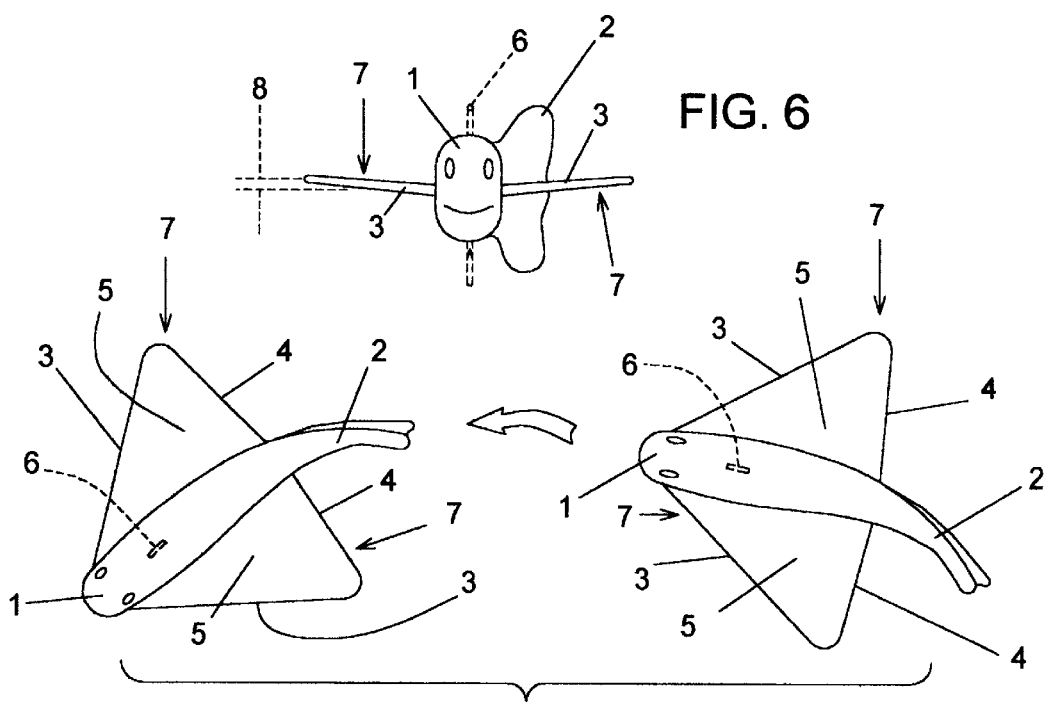
FIG. 6
FIG. 3

THRUST GENERATING FLEXIBLE FIN FISHING LURE

FIELD OF THE INVENTION

This invention relates to artificial fishing lures, specifically to an improved soft flexible lure incorporating a thrust generating flexible fin design for propulsion, ease of operation, and a more realistic swimming action.

DESCRIPTION OF PRIOR ART

The present invention relates to fishing lures, and more particularly, concerns a thrust generating flexible fin fishing lure without the use of springs, electrical motors or other mechanical propulsion devices. The present invention includes means for redirecting a portion of a flow of water moving past the lure as the lure falls or rises in the water and, thereby, causes thrust which moves the lure forward through the water. The present invention also includes a curved tail which turns the lure in a set direction as it is propelled through the water by means of the thrust generating flexible fins. The operation of the thrust generating flexible fins also adds a realistic appearance to the lure as it swims in a continuous circle.

No devices were found in the art which have a similar objective of thrusting the lure forward through the water in a circular pattern without the assist of a motor or other power source. U.S. Pat. No. 4,305,220 (Couillard) teaches an artificial fishing lure which dives when "jerked" by the connecting fishing line and, subsequently, rises slowly in the water when line pressure is released. Couillard's art fails to achieve the natural and more realistic movements of the present invention, and does not in any manner provide propulsion for the lure or cause the lure to swim in a continuous circular pattern.

U.S. Pat. No. 4,550,518 (Layson) is another fishing lure or decoy which attempts to simulate the natural movement of live bait in which is taught the use of inflatable realistic colored fish images which float in a body of water.

Although this technique produces images which appear to be moving in a flowing current of water, it fails to provide the more realistic appearance of the present invention as the thrust generating flexible fins propel the lure through the water in a fully circular pattern.

Another type of fishing lure which attempts to simulate realistic movement is found in U.S. Pat. No. 4,177,597 (Thomassin), in which is taught the use of thin flexible extensions in an essentially rectilinear form and which form a variable angle between them. This lure, when pulled through the water by the connecting fishing line, produces motion of the thin flexible members simulating realistic movement of the artificial bait. Here again, this lure fails to provide the more realistic appearance of the present invention as the thrust generating flexible fins propel the lure through the water in a fully circular pattern. This lure does not provide any means of propulsion.

One example found in the art which does provide a means of propulsion is found in U.S. Pat. No. D345,003 (Maleszewski). This Design Patent clearly includes a means of providing thrust and forward movement of a lure through water by the use of an electrical or wind-up, spring-driven motor. Although this lure is self-propelled, it fails to provide the more realistic appearance of the present invention as the manually operated thrust generating flexible fins propel the lure through the water in a fully circular pattern. The present invention does not require the winding of a spring motor or the use of battery operated motors.

Disclosed in U.S. Pat. No. 4,845,883 (Langer) is a fishing lure which has the ability to glide down and away for the fisherman when cast into the water. Although this lure does glide, it fails to provide the more realistic appearance of the present invention as the thrust generating flexible fins propel the lure through the water in a fully circular pattern. This lure does not provide a means of propulsion as in the present invention.

Those skilled in the art will recognize that these are but a few examples of the literally hundreds of fishing lures which have been provided for attracting fish. Still another very popular type of fishing lure is designed for creating an irregular swimming pattern as it is dragged through the water by a fishing line. Some of the devices which are included in this category make use of spoon type elements which are pivotally attached to the rear of a lure body, for being dragged behind the body, thereby, creating the irregular swimming pattern.

Other casting lures make use of flexible tails made of long strands of hair, vinyl cord or flexible rubber for creating similar irregular wave-like patterns behind the lure as it is being dragged through the water. Although these type of devices do create a random pattern of movement as they are pulled through the water, the amount of effort required to drag said devices through the water is significant when compared to that required in using the present invention due to the thrust generating fins of the current invention.

Also, such devices of the prior art are designed to move laterally through the water, which requires that they be extracted and recast into the water many times in order to pass by enough fish to be effective. On the other hand, the present invention is capable of moving in large circular patterns as it either falls through the water under the force of gravity or as it is pulled upward toward the water's surface by the fish line, thereby, providing much longer patterns of not only continuous natural movement but also circular movement through the water with each cast of the lure.

Although the examples of prior art fishing lure devices described above, and other similar devices, may be suitable for the particular purpose to which they address, they would not be as suitable for the purposes of the present invention. After reviewing the description and appended drawings illustrating the present invention, those skilled in the art will readily recognize that the thrust generating flexible fin lure provides the fisherman with a new and novel lure which swims in a circular pattern with realistic looks and swimming action.

OBJECTS AND ADVANTAGES

In view of the foregoing disadvantages in the known types of fishing lures now present in the art, the invention disclosed herein provides an improved thrust generating flexible fin fishing lure for use in either casting or jigging type fishing. The fishing lure of the present invention includes an elongated body, a curved tail and a means for redirecting a portion of a flow of water moving past the lure toward the curved tail, which in turn redirects the flow of water to either side of the lure, thereby, causing the lure to move forward through the water in a circular pattern as it is either allowed to sink in the water or is pulled up to the surface of the water. As such, the general purpose of the present invention, which is described in greater detail below, is to provide a new and improved flexible fin fishing lure which has all the advantages of the prior art and none of the disadvantages. To attain this, one possible embodiment of the present invention is illustrated in the appended drawings.

It is, therefore, an object of the present invention to provide a new and improved means of generating a small amount of forward thrust for the purpose of propelling the lure through the water.

It is a further object of the present invention to provide a means of propulsion which does not require electric or other forms of motive power.

It is a further object of the invention to provide a lure which is capable of swimming in a continuous circular pattern as it is either allowed to fall under the force of gravity, or is pulled toward the water's surface by the operator.

It is a further object of the present invention to provide a new and improved thrust generating flexible fin fishing lure which is easier to operate.

It is a further object of the present invention to provide a more realistic appearance due to the novel design and movement of the thrust generating flexible fin operation.

It is a further object of the present invention to provide a new and improved thrust generating flexible fin lure which allows greater productivity per cast by allowing the operator to move the lure through a greater area of water by stimulating the lure to swim in alternating rising and falling circular patterns as the operator alternates between pulling the lure upward and letting it fall again.

These together with other objects of the invention, along with the various features of novelty which characterize the thrust generating flexible fin fishing lure of the present invention, are pointed out with particularity in the claims herein. The more important objects of the present invention have been outlined rather broadly in order that the detailed description which follows may be better understood and in order that the present contribution to the art may be better appreciated. For a better understanding of the present invention, its operational advantages and the specific objects attained by its uses, reference should be made to the accompanying drawings and descriptive matter. Those skilled in the art will readily ascertain the invention's capability of other embodiments and of being practiced and carried out in various ways.

In this respect, the details of construction discussed herein, and the arrangements of the components set forth in the following description and appended drawings are for illustrative purposes and are not intended to be limiting in scope.

Those skilled in the art will appreciate the concept upon which this disclosure is based. The present invention may readily be utilized as a basis for the designing of other structures, methods and systems for carrying out the purposes of the present invention. Said other structures may include, but not be limited to, those which are aesthetic in nature, and which substantially perform the same result as the present invention. It is important, therefore, that the claims herein be regarded as including such equivalent structures, construction, methods and systems insofar as these do not depart from the spirit and scope of the present invention.

BRIEF DESCRIPTION OF THE DRAWING FIGURES

FIG. 1-A is a left side view showing the thrust generating flexible fin lure as it descends down and forward through the water. Fins are flexed upward due to water acting on the bottom surface of said fin(s).

FIG. 1-B is an enlarged sectional view of a typical cross-section of the thrust generating flexible fin (shown in FIG. 1-A) when the lure is descending down and forward through the water.

FIG. 2-A is a left side view of the thrust generating flexible fin lure as said lure is being retrieved or pulled up through the water. Water acting on the top fin surface causes the fin(s) to flex down.

FIG. 2-B is an enlarged view of a typical cross-section of the thrust generating flexible fin(s) when the lure is being pulled up through the water as in FIG. 2-A.

FIG. 3 is a top view(s) of the thrust generating flexible fin lure showing the tail section set at an angle to provide directional control and cause the lure to swim in a circle.

FIG. 6 is a frontal view of the thrust generating flexible fin lure's optional fin dihedral for increasing vertical stability similar to that employed for typical aircraft use. The exact amount of dihedral in not critical and, therefore, not specified herein.

Figure 4:
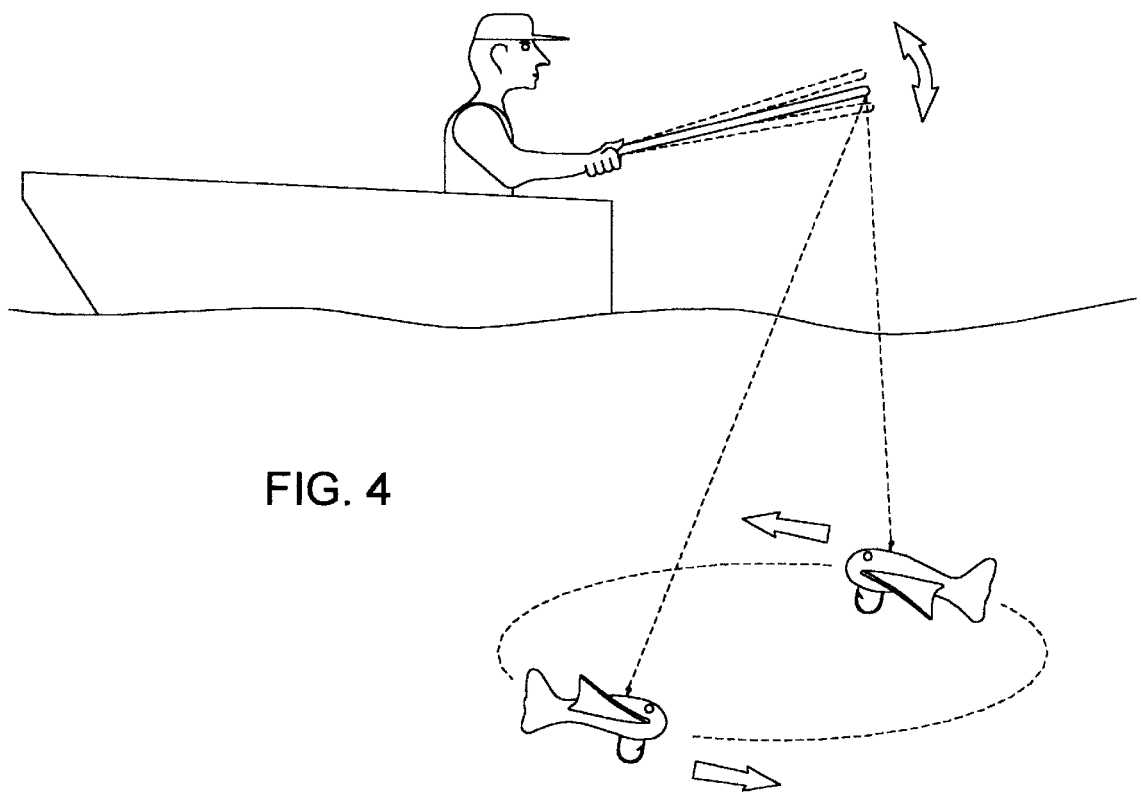
FIG. 4 shows the thrust generating flexible fin lure being used as a standard "Jig" (used with a series of short pulls on the line); the fin design and curved tail cause the lure to swim in a full and continuous circle.

REFERENCE NUMERALS 1 main body of lure
2 curved tail
3 leading edge of fin(s)
4 trailing edge of fin(s)
5 fin(s) connective webbing
6 fish hook
7 general fin unit comprising of a leading edge (3), connective webbing (5), and a trailing edge (4)
8 typical dihedral of fin(s) for vertical stability

DETAILED DESCRIPTION OF FIG. 1-A TO 6

The present invention comprises a new and novel thrust generating soft flexible fin type fishing lure for use in various types of sport fishing, such as ice fishing, jigging, bait casting, or the like. A typical embodiment of the thrust generating flexible fin lure is illustrated in FIG. 1-A, 2-A and FIG. 3. This embodiment comprises an elongated body (1), at least a pair of thrust generating flexible fins (7) on either side, and a curved tail (2) which is set at an angle. A suitable fishing hook (6) is inserted through the lure's body (1) in the manner shown.

Operation of the thrust generating flexible fin lure is achieved by the unequal flexing of the fin(s) (7) during operation. When the lure is placed in a body of water and allowed to descend, water acting on the bottom of the fin (7) causes said fin to tip or flex up as shown in FIG. 1-A and FIG. 1-B. Unequal tipping or flexing is caused by the difference in the cross-sectional area of the fin's leading edge (3) which is much greater in thickness than the trailing edge (4) or the connecting webbing (5). Due to the unequal thickness of the fin's leading edge (3), webbing (5), and trailing edge (4), the trailing edge will flex to a much greater degree than other components of the fin (7).

Likewise, when the lure is being pulled up through the water as in FIG. 2-A, water acting on the top surface of the fin(s) (7) causes the fin to flex down. Here again, FIG. 2-B shows the same unequal flexing of fin components (3), (4), and (5).

FIG. 1-B and FIG. 2-B illustrate a typical cross-section of the fin(s) (7) and their flexing characteristics when descending and ascending, respectively, in the water.

FIG. 6 illustrates a typical frontal view of the thrust generating flexible fin fishing lure, wherein, a typical amount of fin dihedral (8) is employed for increasing vertical stability of said lure when swimming in a body of water.

FIG. 1-A and 2-A also show the typical placement of a suitable fish hook (6) which provides a means of attaching a fishing line as well.

FIG. 4 illustrates the thrust generating flexible fin lure in a typical "jigging" application. This view shows the fisherman "jigging" or giving the line a series of short pulls and allowing the lure to again descend. In this manner, the thrust generating fins as illustrated in FIG. 1-A through FIG. 3 will cause the lure to move forward through the water. The fin design will generate thrust and forward movement while the lure is both ascending and descending through the water. Here again, the curved tail (2) is employed to induce circular motion.

Figure 5:
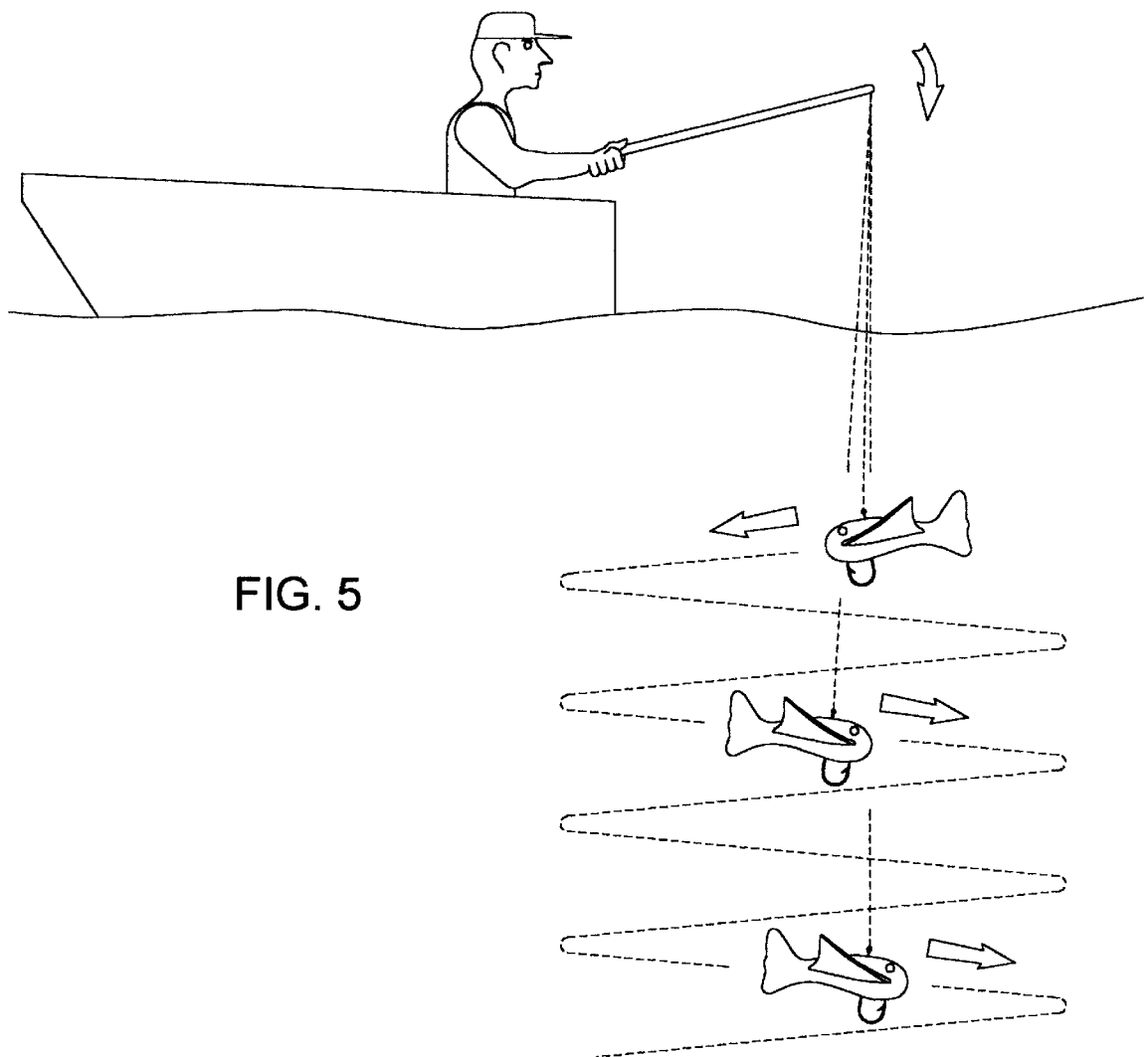
FIG. 5 shows the thrust generating flexible fin lure being used in a standard "casting" application. The fin design and curved tail cause the lure to swim down and forward in a fully circular or spiral pattern.

FIG. 5 illustrates yet another popular method of fishing known as "casting." In this application, the lure is cast away from the fisherman and allowed to swim down and forward in a circular pattern. When the lure is descending, its fin(s) flex in a manner illustrated in FIG. 1-A and FIG. 1-B. Upon reaching the end of the line, the lure is retrieved. Here again the lure's fin(s) flex down as illustrated in FIG. 2-A and FIG. 2-B as the lure is pulled up through the water. Again, thrust is generated in both ascending and descending phases of operation.

OPERATION OF THE THRUST GENERATING FLEXIBLE FIN LURE

The thrust generating flexible fin lure must be constructed from a material which is sufficiently flexible to allow vertically upward yielding of the fin(s) under the normal forces of gravity as the lure is allowed to descend in a body of water. Likewise, said fin(s) must be sufficiently flexible to yield vertically downward when the lure is retrieved or pulled upwards through the water. Conversely, said material must be sufficiently rigid so as to prevent the fin(s) leading edge from moving in a near vertical plain when said lure is allowed to descend under gravitational forces or is retrieved by the fisherman. Typically, the present invention should be constructed using soft flexible plastisols or other similar materials which are used in the making of other fishing lures commonly available and known as "rubber worms." The operation of the thrust generating flexible fin fishing lure will be described in two parts: a) the operation and function of the thrust generating fins when the lure is placed in a body of water and allowed to descend, hereafter known as the "down cycle", b) the operation and function of the thrust generating flexible fin lure when the lure is being pulled up or through the water, hereafter known a the "up cycle."

The Down Cycle

When the lure is cast or otherwise placed in a body of water, gravity begins the process of pulling the lure down through the water. As the lure descends, water pressure acting on the bottom surface of the fin(s) overcomes the fin(s) inherent tendency to stay in a neutral or near central position and causes the fin(s) to flex up as illustrated in FIG. 1-A and further clarified by FIG. 1-B. Because the lure's fin(s) (7) are much thicker at the leading edge (3) than at the trailing edge (4), the water pressure acting on the bottom surface causes the trailing edge (4) of said fin(s) to flex or yield a greater distance than that of the leading edge area of the fin (7). With the lure moving down through the water under the force of gravity (FIG. 1-A) and the fin(s) (7) flexed up (as further clarified in FIG. 1-B), a portion of the water acting on the bottom surface of the fin(s) (7) is redirected rearward toward the tail (2) surface. As water is redirected rearward, thrust is generated and the lure reacts by moving forward through the water. After forward movement is induced by the thrust generated by the redirected flow of water, a portion of the water moving past the curved tail (2) is further redirected to one side and, thereby, directs the swimming action of the lure in a circular pattern. Thus, the thrust generating flexible fin lure will continue its descent and move in a forward and fully circular pattern until said lure reaches the end of the fishing line or is retrieved (the up cycle).

The Up Cycle

The operation of the thrust generating flexible fin fishing lure in the up cycle is the exact opposite of the down cycle. When the thrust generating flexible fin lure is retrieved or pulled up through the water, water acting on the top surface of the fin(s) (7) increases the pressure on the top surface of the fin(s) (7) and causes the fin(s) to flex or yield down as illustrated in FIG. 2-A and further clarified in FIG. 2-B. Again, the fin(s) deflection is greater at the trailing edge (4) than at the leading edge due to the fin(s) leading edge cross-sectional area being greater than that of the trailing edge (3). Due to the movement of the lure as it is pulled upward through the water, and the fin(s) which are flexed down as illustrated in FIG. 2-A and further clarified in FIG. 2-B, a portion of the water flow is redirected rearward toward the curved tail (2) surface. As water is redirected rearward, thrust is generated which, in turn, causes the lure to move forward. As the lure moves forward, a portion of the redirected water from the thrust generating fin(s) is further redirected to one side by the curved tail (2) causing the lure to swim in a fully circular pattern.

As illustrated in FIG. 4, the lure can swim in a full and continuous circle simply by "jigging" the fishing pole. Jigging is the process of pulling the lure up slightly and allowing it to descend to its original position and repeating this series of actions in rapid or frequent succession. Jigging will cause the thrust generating fin(s) (7) to operate as outlined above and the lure will continue to swim in a circular pattern with very little effort by the operator.

Illustrated in FIG. 5 is the present invention being used as a "casting" lure. In this application the lure is cast away from the fisherman and allowed to descend in the water. As outlined above in the "down cycle" description, the lure's fin(s) (7) tip up and cause thrust and forward movement of the lure. The curved tail (2) again keeps the lure swimming in a circular pattern. In this application, the lure will continue down and forward in a circular pattern until it reaches the end of the fishing line or is retrieved. Upon retrieval, the lure operates as outlined above in the "up cycle" description, and continues to swim in a circular pattern.

Although not shown in the drawings for clarity, the present invention should incorporate a standard "swivel" located in the fishing line to prevent twisting of the line as the lure continues swimming in a circular pattern.

The thrust generating flexible fin fishing lure's swimming action and forward speed can be easily adjusted by means of positioning the fishing hook forward or aft of said lure's natural center of gravity, much the same as adjusting a model airplane's center of gravity and flight characteristics by adding weight to the nose or tail of the aircraft. By inserting the fishing hook forward of the lure's natural center of gravity, the lure will move forward and down through a body of water at a faster rate. Conversely, the lure's forward and downward speeds will decrease when the fishing hook is inserted aft of said lure's center of gravity.

The thrust generating flexible fin fishing lure's inherent vertical stability can also be improved through the use of fin dihedral as illustrated in FIG. 6, in particular, fin feature (8).

CONCLUSIONS

Accordingly, the reader will see that the thrust generating flexible fin fishing lure will offer a new approach to the art of fishing. The novel design and operation of the present invention offers many advantages over current products available in the market place or found in the art. Some of the more important advantages of the present invention are:

a) this lure provides a means of generating thrust and forward motion to assist in the operation and motion of same;

b) this lure will swim in a continuous and fully circular pattern;

c) the operation of the thrust generating flexible fin along with the circular swimming pattern of the lure provides a more realistic appearance to the fish;

d) the thrust generating flexible fin lure is very easy to manufacture;

e) the thrust generating flexible fin lure is very cost effective when compared to other lures outlined in the art;

f) the thrust generating flexible fin lure is designed to comply with all State, Federal, and other regulations and guidelines.

The inventor has given a non-limiting description of one possible embodiment of the present invention, to which many changes may be made without deviating from the spirit of the invention. While this invention has been described with reference to an illustrative embodiment, this description is not intended to be construed in a limiting sense. Various modifications and combinations of the present invention will be apparent to a person skilled in the art upon reference to the description herein.

It is, therefore, contemplated that the appended claims cover any such modifications or embodiments that fall within the true scope of the present invention.

It is claimed:

1. A flexible fin fishing lure, comprising:

an elongated body having at least a pair of flexible fins, each said fin having a leading edge, trailing edge, and connective webbing between said leading edge and said trailing edge, said fins being configured to unequally flex in a manner such that contact of said fins with a vertical oriented flow of water generated by vertical movement of said lure in the water induces an unequal flexure of said fins to thereby redirect a portion of the water in a rearward direction and thereby cause forward movement of said lure.

2. The flexible fin lure as recited in claim 1 wherein a thickness of said leading edge of each of said fins is greater than each of a thickness of said connective webbing and a thickness of said trailing edge thereof.

3. The flexible fin lure as recited in claim 2 wherein said unequal thicknesses do cause said fins to flex unequally when said lure is made to move vertically in a body of water.

4. The flexible fin lure as recited in claim 3 wherein said unequal flexing causes water to be redirected rearward when said lure is allowed to descend or is being pulled up through a body of water and, thereby, causes said lure to move forward through a body of water.

5. The flexible fin lure as recited in claim 1 wherein said elongated body of said lure has a curved tail set at an angle to one side thereof and is thus configured to redirect a portion of the water to flow to said one side of said lure and thereby cause said lure to move in a substantially continuous and circular pattern.

6. The flexible fin lure as recited in claim 1 wherein said fins are made substantially of a soft flexible material which is sufficiently limber for allowing a vertically orientated flow of water moving past said fins to cause flexing thereof, said soft flexible material being conversely rigid enough for preventing a major portion of said fins from moving into a near vertical plane when descending under the forces of gravity or when ascending upon application of upward forces by a fisherman.

7. The flexible fin lure as recited in claim 1 further incorporating a means for connecting said lure to a fishing line.

8. The flexible fin lure as recited in claim 7 wherein said fishing line connection is a fishing hook, including a u-shaped lower portion with a sharpened end extending below said elongated body, a linear mid-portion connected to the u-shaped lower portion and extended vertically through said elongated body, and an aperture upper portion connected to the linear mid-portion and extending above said elongate body.

9. The flexible fin lure as recited in claim 8 wherein the location of the fishing hook is insertably positioned forward or aft within said elongated body of said lure for the purpose of changing a center of gravity of said lure and, thereby, changing the forward speed and rate of ascent or descent during operation.

10. The flexible fin lure as recited in claim 1 wherein said fins are provided with a suitable amount of dihedral for causing added vertical stability and improved performance and ease of use.

11. A flexible fin fishing lure, comprising:

an elongated body comprised of a soft flexible material, said body having at least a pair of flexible fins, each said fin having a leading edge, trailing edge, and connective webbing between said leading edge and said trailing edge, a thickness of said leading edge of each of said fins being greater than each of a thickness of said connective webbing and a thickness of said trailing edge thereof.

12. The flexible fin fishing lure as recited in claim 11, wherein said body of said lure has a curved tail set at an angle to one side thereof.

13. The flexible fin fishing lure as recited in claim 11, wherein said body has a fishing hook mounted therewithin, said fishing hook including a u-shaped lower portion with a sharpened end extending below said body, a linear mid-portion connected to the u-shaped lower portion and extended vertically through said body, and an aperture upper portion connected to the linear mid-portion and extending above said body.

* * * * *